Figure 1:
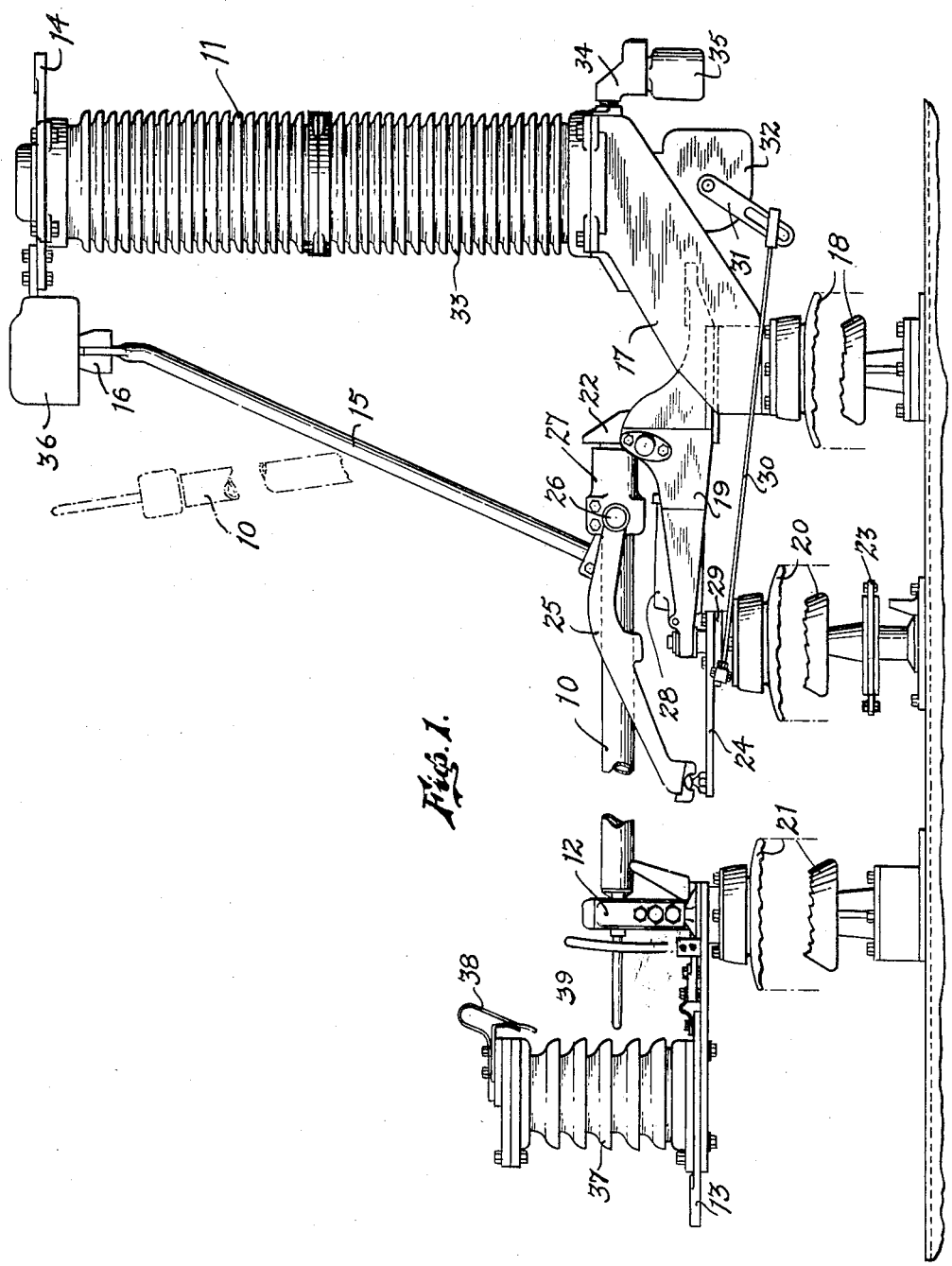

June 10, 1958    A. C. SCHWAGER    2,838,636
HIGH VOLTAGE CIRCUIT INTERRUPTING SWITCH MEANS
Filed March 16, 1956    3 Sheets-Sheet 1

INVENTOR.
AUGUST C. SCHWAGER.
BY
ATTORNEY

INVENTOR.
AUGUST C. SCHWAGER.
BY
Wm. H. Atkinson
ATTORNEY

June 10, 1958   A. C. SCHWAGER   2,838,636
HIGH VOLTAGE CIRCUIT INTERRUPTING SWITCH MEANS
Filed March 16, 1956   3 Sheets-Sheet 3
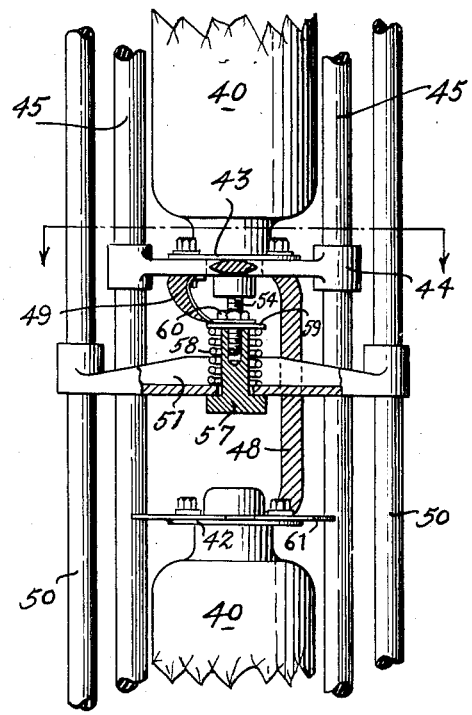
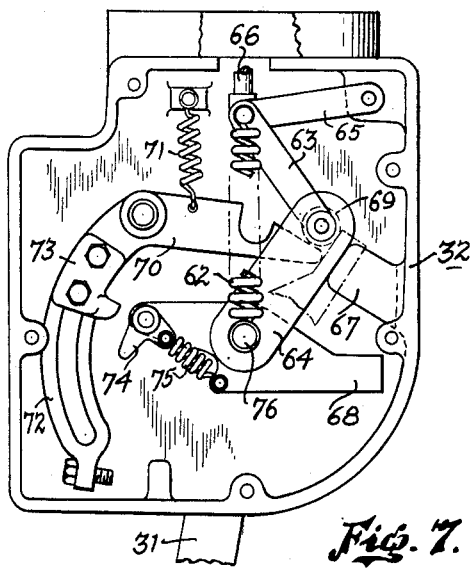
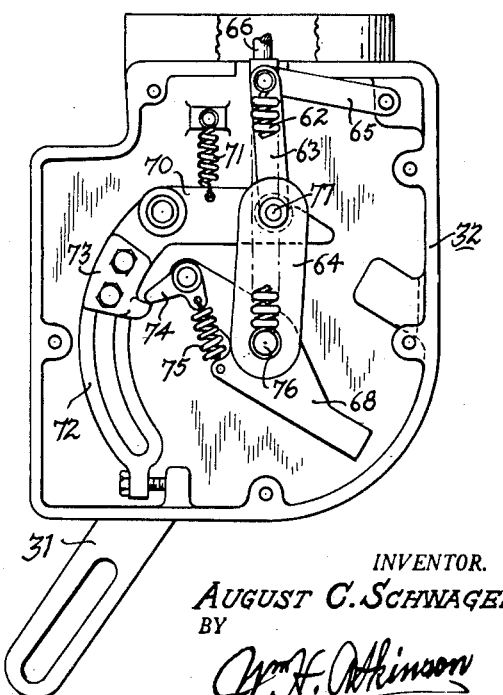
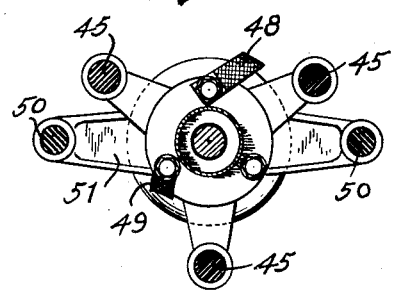
INVENTOR.
AUGUST C. SCHWAGER.
BY
*Wm. H. Atkinson*
ATTORNEY United States Patent Office 2,838,636
Patented June 10, 1958

2,838,636

HIGH VOLTAGE CIRCUIT INTERRUPTING SWITCH MEANS

August C. Schwager, Portland, Oreg., assignor to Schwager-Wood Corporation, Portland, Oreg., a corporation of Oregon Application March 16, 1956, Serial No. 571,923

6 Claims. (Cl. 200—145)

My present invention relates to electrical circuit switching apparatus and more particularly to a circuit breaking means employing one or more hermetically sealed and evacuated chambers each having circuit controlling contacts operating in series with each other and a control mechanism therefore, which among other uses will be found well suited for use with an air-break disconnecting switch blade to disconnect and/or isolate load and capacitor circuits in a high voltage electric power distribution system.

An object of the invention is to provide an air-break circuit disconnecting switch and an arc confining circuit breaker of the vacuum insulated type that will interrupt transformer magnetizing currents, line charging currents, and load currents at locations where the cost of conventional circuit breaker having a sufficient fault interrupting ability may not be justified and where the use of an air-break switch alone would be hazardous because resulting unconfined electric arc may develop into a system fault.

An object of my present invention is to provide a practical and inexpensive high voltage power transmission line circuit-breaker of the vacuum insulated type, which is light in weight, simple in construction, efficient and reliable in operation and suitable for installation upon a transmission line supporting pole or tower.

Another object of my present invention is to provide a circuit interrupting means including an air-break disconnecting switch and a vacuum insulated circuit breaker which will operate conjointly to interrupt load or charging currents and fault currents in a high voltage power transmission line without an exposed arc or flame.

A further object of the invention is to provide a circuit breaker means for high voltage transmission lines in which a plurality or individual units each having separable contacts mounted within an evacuated and hermetically sealed container with said units connected in series circuit and operating simultaneously to provide a plurality of breaks with a substantially corresponding voltage drop across each break in the circuit and wherein the number of such units operating in series will determine the over-all voltage interrupting rating of the circuit breaker.

Another object of the invention is to provide a timing and operating mechanism for controlling a circuit breaker of the above defined type which will operate to control the circuit breaker in timed relation with a high voltage circuit isolating switch blade, to the end that the circuit will be first interrupted by the circuit breaker without any exposed arc or flame and subsequently isolated by a circuit opening operation of the circuit isolating switch blade.

Other objects and advantages of the invention will be, in part, evident to those skilled in the art and in part pointed out hereinafter in connection with the accompanying drawings wherein there is shown by way of illustration and not of limitation a preferred embodiment thereof.

Figures 2, 3:
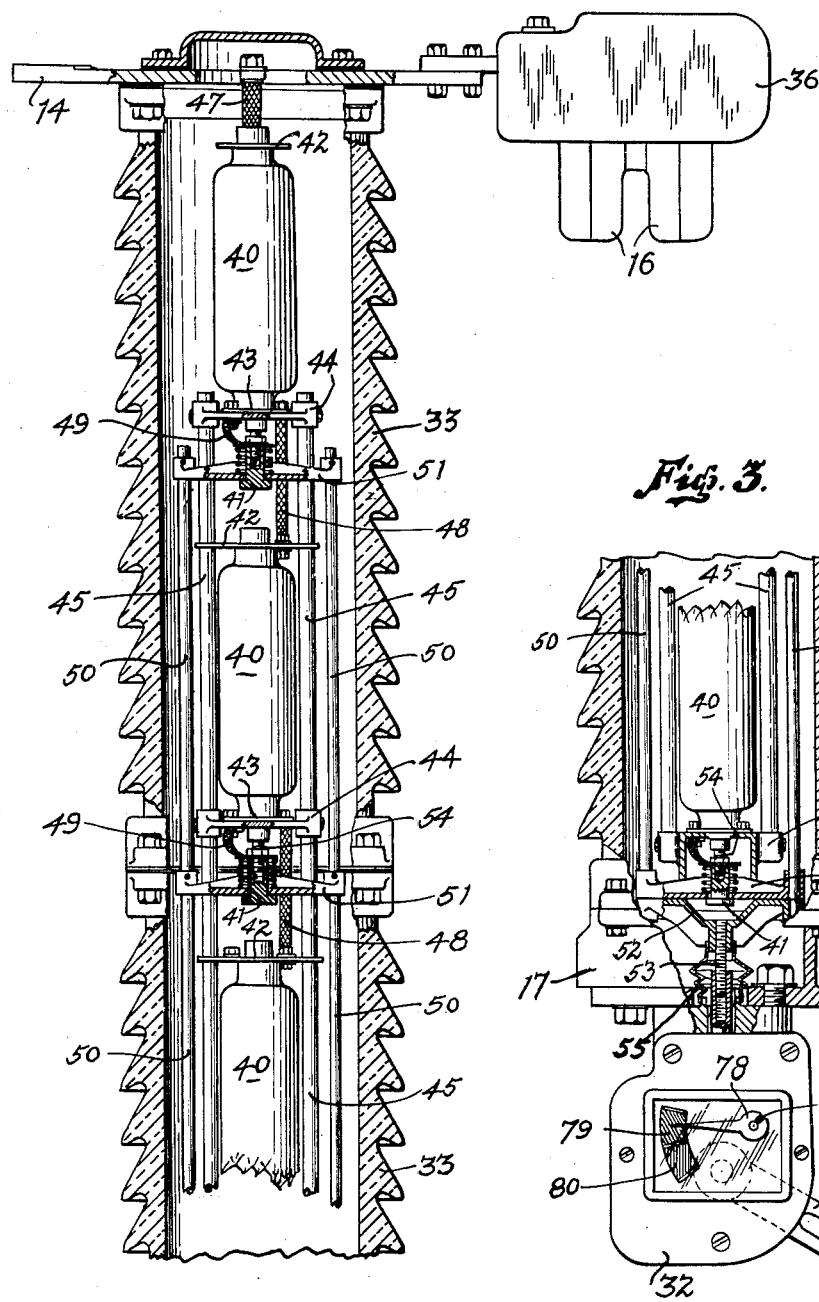

In the drawings:

Figure 1 is a fragmentary side elevation of my improved circuit-breaker as employed in connection with an air-break switch of the blade twisting type, Figure 2 is a vertical view partly in section showing details of the circuit-breaker constructed in accordance with the invention, Figure 3 is a vertical view partly in section showing a remaining portion of circuit-breaker as shown in Figure 2, Figure 4 is a fragmentary side elevation slightly enlarged showing details of the assembly, Figure 5 is a sectional view taken along the lines V—V of Figure 4 looking in direction of arrows, and Figures 6 and 7 are side elevations of a spring operated mechanism for controlling the operation of the vacuum switch contacts.

While there is now available on the market a number of arc interrupting circuit breakers designed for operation in conjunction with an air break switch, these interrupting devices employ circuit breakers having contacts that are either immersed in oil, subjected to an oil or gas blast, or are of the expulsion type. Devices of this character, however, because of insulating characteristics of oil or gas blast require the introduction of a wide break or contact separation, which may vary from several inches to several feet and they therefore become bulky and require a complicated and massive operating mechanism and usually operate with considerable arcing and external flame with the associated hazards. In addition to this the life of such circuit interrupting devices is limited, either due to carbonization of the oil or wear of component parts, and consequently they require frequent inspection for maintenance and replacement of parts.

In the transmission of high voltage electric power, air-break disconnecting switches are generally used to isolate sections of the power transmission system or for isolating a load circuit from an associated network. To avoid arcing upon contact separations, this switching operation in most instances must be carried out under conditions of no-load on the circuit, but even under no-load conditions the high voltages now employed in such transmission systems produce charging currents of appreciable magnitude which may cause considerable arcing. While certain of these disconnecting switches, particularly those of the low-voltage type, have successfully interrupted charging and small load currents their use at high voltages is unsatisfactory as any arcing during the circuit opening operation may be blown across the line or to grounded parts and thus cause a flow of fault currents.

My improved vacuum insulated circuit breaker, as will presently appear, has separable contacts that are enclosed within a hermetically sealed envelope or glass bulb that is evacuated to the highest possible degree. The arc quenching and insulating quality of the contact gap in such a circuit breaker is extremely high and has been found to be in the order of one million volts per 0.1 inch of contact separation. Such a separation of the contacts has been found to be sufficient to open a high voltage circuit under practically all conditions of operation and when constructed and employed in the manner here contemplated the vacuum circuit breaker has been found to operate in an extremely efficient manner and without a restrike in the interruption of a 230 kv. high voltage circuit both under load and fault conditions.

An advantage found in the high dielectric strength of a vacuum is that repeated spark-overs can occur in properly processed vacuum insulated units without damage and with instantaneous and complete recovery of dielectric strength as soon as the overvoltage is removed. This extreme increase in breakdown strength is important in several aspects, for example; a much smaller contact separation is required for either high or low voltage current interruption or for voltage hold off than is necessary in other styles of circuit breakers. Arc interruption is much more rapid even with slower contact opening speeds and especially important is the fact that at proper opening speeds, deionization upon arcing between the contacts occurs at the first current zero in an alternating current flow. This is especially valuable in switching capacitor loads and due to the high insulating value of the vacuum in the gap, re-strikes such as are met with in switching capacitor banks or in the opening of long line power transmission ssytems, do not occur even under the most severe switching operations. Due to the complete absence of gas molecules, around the contacts of such a circuit breaker, any arc formed will be small and little or no burning of the contacts such as occurs in other styles of circuit breakers will result. Consequently large capacitor banks can be switched many thousands of times without any material deterioration of the circuit interrupting contacts.

As distinguished from the above, the limitations of present day oil circuit breakers in switching capacitive current loads are well known. After an interruption has taken place, the dielectric strength of the oil builds up at such a slow rate that delayed restrikes take place often as much as ½ cycle later, with all their harmful effect. The vacuum switch, however, is not affected by this shortcoming since after 1/20 of a cycle, corresponding to 1/10" contact separation, a dielectric strength in the order of 100,000 volt R. M. S. is available. While an oil circuit breaker can restrike ½ cycle after contact separation, a vacuum switch would not fail if the identical voltage would appear 1/20 of a cycle after its contact separation. Another advantage aside from the obvious advantage of restrike free performance, is that in the vacuum switch the interruption is practically independent of contact parting time.

For a more detailed description of the invention reference is now made to the accompany drawings where in Figure 1 there is shown an air-break switch having a circuit disconnecting blade, designated by the numeral 10, as operating in series circuit with a vacuum insulated circuit interrupting switch 11 constructed and operating in accordance with this invention. The switch blade 10 engages a stationary switch blade contact 12 to which there is connected a line terminal 13, and the circuit interrupting switch 11 has a line terminal 14. Extending upwardly from the switch blade 10 there is an auxiliary shunt circuit forming blade 15 that engages a contact clip 16 carried by the circuit interrupting switch line terminal 14. In this instance the switch 11 is mounted upon a bracket 17 carried by an insulator stack 18 and the air-break switch blade 10 is shown as pivotally mounted upon a bridging member 19 that extends from the top of the insulator stack 18 to a second insulator stack 20. This insulator stack 20 is rotated about a vertical axis and when turned it operates in the conventional manner as a means for moving the switch blade 10 between its opened and closed circuit controlling positions. A third insulator stack 21 carries the line terminal 13 and the air-break switch blade contact 12 with which the switch blade 10 cooperates.

The above described assembly with the shunt circuit forming blade 15 operating in connection with the pivotally mounted air-break switch blade 10, as a means for short-circuiting the contacts of the vacuum insulating circuit interrupting switch 11, basically constitutes the subject matter of my co-pending application, S. N. 538,145 filed October 3, 1955, and entitled, "Circuit Interrupting and Isolating Switch." The invention and claims of this prior application are directed primarily to the utilization of the so-called beaver-tail twisting mechanism by which the switch blade 10 is rotated or twisted as a means for controlling the movements of the shunt circuit forming blade 15 and the timing of the circuit breaker 11, which as there described need not necessarily be of the vacuum insulated type. As in my prior application the air-break switch blade 10 is shown as carried by a supporting member 22 that is journalled upon the bridging member 19 and the upper end of the insulator stack 20 is shown as also journalled at the extending end of the bridging member 19 so that it may be turned about its vertical axis. At its lower end the insulator stack 20 has a double ended diametrically extending lever arm 23 by which this stack either alone or together with a corresponding stack of a similar switch or switches may be simultaneously operated. At its upper end the insulator stack 20 is also shown as having a radially extending arm 24 to the outer end of which there is connected a forked link 25. This forked link straddles the switch blade 10 and is connected to trunnions 26 carried by a rotatable bearing 27 that turns within the supporting member 22. The auxiliary shunt circuit forming blade 15 is mounted directly upon one arm of the forked link 25 and as this forked link operates to impart the turning or twisting motion to the switch blade 10 the auxiliary shunt forming blade 15 will be caused to swing laterally in a plane substantially at a right-angle to the plane in which the switch blade 10 moves and out of contact with the switch clip 16. To compensate for the weight of the switch blade 10 and to provide for ease of operation the bridging member 19 is shown as encompassing and supporting a counter-balancing spring means 28.

In addition to the radially extending arm 24, the insulator stand 20 also carries a second radially extending arm 29, that is connected by a tie rod 30 to an operating crank arm 31 of an operating mechanism 32 by which the vacuum insulated switch 11 is controlled. At the base of the vacuum insulated switch enclosing bushing, designated by the numeral 33, and communicating with the interior thereof to prevent the accumulation of moisture due to condensation I show a dehydrater device 34 with a removable container 35 into which a silica-jell or similar moisture absorbing material is contained. At the upper end of the bushing 33 and disposed over the contact 16 at the outer end of the shunt forming blade 15, there is a shroud or cover 36 to protect the contact 16 against the accumulation of ice and snow. As a further feature of the assembly here disclosed, I also show the insulator stand 21 as supporting a resistance unit 37 that is connected at its lower end to the line terminal 13 and at its upper end this unit has a resilient wiping contact 38 with which an extending arcing horn 39 carried by the switch blade 10 engages as the switch blade 10 moves toward its stationary contact 12 in closing the circuit. The purpose of this resistance is to reduce to a safe value the flow of any charging current that may be present on a line with which a connection is to be established by a closing of the switch blade 10.

The employment of an oil circuit breaker with a full line current carrying capacity in combination with a circuit isolating switch is not justified in many locations along a power distribution system and while a circuit breaker of the oil insulated type having a short or intermittent full line current carrying capacity might be employed with a shunt circuit forming blade as proposed in my prior application, the construction and operating mechanism of such a circuit breaker would be impractical and expensive on a high tension system such as is here contemplated. In other words, it is essential that the circuit controlling breaker or, as in this instance, the vacuum insulated switch, must be light in construction and operable by a reliable, but simple and inexpensive operating mechanism. To this end, I propose to employ a series of hermetically sealed vacuum insulated switches connected and operating simultaneously in series circuit in any suitable number depending upon the total voltage of the high tension circuit with which the circuit isolating blade 10 is designed for use. While it is conceivable that a single hermetically sealed and vacuum insulated switch might be designed to carry the full line current and successfully interrupt a high potential circuit of the character contemplated, I propose to use a series of vacuum insulated switches as such a switch has been found to have the capacity to carry the full line current for a short period of time without sacrificing its superior high voltage circuit interrupting ability. With such a switch having separable contacts hermetically sealed in an evacuated chamber it is also possible to obtain an arc free interruption of the circuit under all operating current conditions. To accomplish this, however, it is necessary that the auxiliary or shunt circuit forming blade 15 be rendered inoperative by disconnection with its contact clip 16 when the circuit through the vacuum insulated switch 11 is to be opened. In practice this disconnection in the shunt circuit formed by the auxiliary blade 15 should occur in point of time prior to an actual break in the circuit between the switch balde 10 and its co-operative stationary terminal contact 12. As will be later pointed out in more detail the position and operating range of the lever arm 31 of the operating mechanism 32 is so related to the movements of the switch blade 10 that the circuit opening and circuit closing operation of the vacuum insulated switch will open the circuit therethrough as the disconnecting switch blade 10 is initially rotated or twisted and prior to a circuit opening pivotal movement thereof and to close as the disconnecting switch blade 10 approaches its final open circuit position with respect to the stationary terminal contact 12.

For a detailed description of the vacuum insulated switch arrangement here proposed, reference is now made to Figures 2, 3, 4 and 5 of the drawings.

In these figures of the drawings, I show four individual vacuum insulated switches 40 each having a hermetically sealed envelope within which there is a stationary contact, not shown, extending inwardly from the upper ends thereof and extending through the lower ends of these envelopes in hermetically sealed relation there is a movable contact operating member 41 by which a movable contact within the envelope 40 is moved into and out of circuit forming engagement with the stationary contact. At the upper ends of each of the switches 40 there is an external terminal 42 that is connected to the stationary contact and at the lower end of each of the switches there is a second external terminal 43 that is connected to the movable contact. As here arranged, in end to end relation, within the enclosing bushing 33, the upper-most of the several vacuum insulated switches 40 are supported upon spiders 44 and the lower-most switch is mounted upon a fixed support 46 carried by the bracket 17 at the lower end of the bushing 33. The spiders 44, which carry the upper-most vacuum switches 40 are mounted upon three vertically extending insulating rods 45 of glass or other insulating material and at their lower ends, these insulating rods 45 are mounted upon and extend upwardly from a fixed support 46. To complete a circuit through the several switches when so arranged, I show a jumper 47 that connects the terminal 42 of the upper-most switch 40 to the line terminal 14 and the shunt blade accommodating terminal 16 and extending between the successive upper and lower terminals of each of the aligned switches 40, there is a jumper 48. To carry the current from the movable contact, I also show additional jumpers 49 through which the circuit is completed from the movable contact operating member 41 to the external terminal 43 at the lower end of each of the switches 40.

As a means for operating the several switches 40, I have shown a ladder-like structure which consists of two spaced vertical rods 50 of glass or other insulating material that carry spaced spanners or bridging members 51 to which the operating members 41 of the individual switches are connected as will be explained in more detail hereinafter. At their lower ends, the spaced operating rods 50 are supported upon a vertically movable yoke 52 that is arranged and adapted to be moved vertically by the operating mechanism 32 which is also to be described in detail hereinafter. At this point, with reference to Figure 3 of the drawings, it will be noted that the yoke 52 is connected to the operating mechanism 32 through a threaded connecting stud 53 by which the relative position of the operating rods 50 with respect to the operating mechanism 32 may be adjusted to impart to the operating members 41 of the individual switches a sufficient movement to obtain the desired contact pressure when the switch contacts are in their closed circuit position and a proper gap therebetween when the switches are in their open circuit position. To insure a substantially simultaneous operation of the individual switches 40, the operating members 41 are also shown as having an adjustable threaded connection stud 54. In this showing it will be noted that the threaded connecting stud 53 between the yoke 52 and the operating mechanism 32 is surrounded by a bellows or corrugated sleeve 55 that operates as a seal between the interior of the operating mechanism 32 and the interior of the bushing 33. The bracket 17 is here shown as formed with a cavity and to provide a breather, I show a pressure relief valve 56 which in conjunction with the dehydrater 34 serves to maintain a substantially uniform atmospheric condition about the several switches 40 within the bushing 33.

As an alternative for the pressure relief valve 56, I may hermetically seal the insulator column 33 and place the container of silica-jell within the enclosure and provide a moisture impervious elastic breather bag or sack of polyethylene over the valve opening. With this arrangement, the air within the insulator column 33 and about the vacuum switches 40 will breathe into the bag and thus maintain an equal pressure with the outside atmosphere. With this arrangement no moisture will accumulate within the insulator column 33 as no moist air will be sucked into the sealed insulator column and about the vacuum switches as there will be no pressure drop.

By referring to Figure 4 of the drawings, it will be noted that the individual switch operating members, designated by the numeral 41, comprise a shouldered member 57 which is held in contact with the under side of the spanner 51 by a compression spring 58 that shoulders against a collar 59 secured to the upper end of the shouldered member 57 by a nut 60 upon the adjustable connection stud 54. With this arrangement, it will be seen that when properly adjusted, a downward movement of the operating rods 50 will cause the movable contact of the switch 40 to also move downwardly into an open circuit position. Upon a reverse or upward movement of the operating rods 50, the spanner or bridging member 51 will operate through the spring 58 and close the contacts of the switch 40. When the movable contact is in engagement with the stationary contact of the switch 40, the compression of the spring 58 will determine the contact pressure. As a further means of support for the vacuum switches 40, there is also a notched plate 61 that is positioned between the three switch supporting rods 45 and in this manner the upper ends of the several switches 40 are held in alignment. As indicated in Figure 5 of the drawing, it will be noted that the spanners or bridging members 51 are arranged and positioned by their supporting rods 50 so as to extend over the center line of the axially aligned switches 40 and out of interfering relation with the stationary supporting rods 45 upon which the switches 40 are mounted.

While it is conceivable that the several vacuum insulating switches 40 may be operated in the manner here indicated by a variety of different reciprocating motion imparting means, in the present instance, however, since the vacuum insulated switches 40 are connected and operated in conjunction with a mechanical motion producing means by which the circuit isolating switch blade 10 is controlled, I have in Figures 6 and 7 of the drawings shown a spring operated mechanism. This operating mechanism, designated generally by the numeral 32, has a tensioned power storing spring 62 that is associated with a toggle formed by the links 63 and 64, which when extended and latched, tensions the operating spring 62 to its energy storing condition. At the upper free end of the toggle link 63, there is a guiding link 65 that limits the operating motion of the power storing spring 62 to a substantially vertical path. At this point, there is an upwardly extending internally threaded member 66 into which the threaded connecting stud 53 is threaded. This forms a connection between the operating spring 62 and the movable yoke 52 that carries the operating rods 50 by which the movable contacts of the several vacuum switches 40 are moved.

In this arrangement, as shown in Figure 6 of the drawings, when the toggle links 63 and 64 are collapsed the toggle link 64 engages two spaced stops 67 between which the extending end of a double ended resetting and tripping lever 68 moves for engagement with a shaft 69 by which the toggle links 63 and 64 are connected. When the toggle links 63 and 64 are extended, as shown in Figure 7 of the drawings, the shaft 69 is engaged by a latching lever 70 that is biased in its operative position by a spring 71. Extending downwardly and of arcuate configuration, the latching lever 70 has a slotted extension 72 that carries an adjustable abutment 73 which is adapted and arranged to be engaged by a pivotally mounted dog 74, mounted at the other end of the double ended reset and tripping lever 68. The dog 74, is here shown as held in its operative position by means of a spring 75 which permits the dog 74 to travel over the adjustable abutment 73 upon a reverse rotation of the double ended reset and tripping lever 68 when the toggle links 63 and 64 are extended and latched with the vacuum switches in a closed circuit condition. The double ended reset and tripping lever 68 is keyed upon a shaft 76, which as hereinabove indicated, is turned by the operating crank arm 31 that is connected through the tie rod 30 to the operating mechanism by which the movement of the air-break switch blade 10 is controlled. At the connecting point between the toggle links 63 and 64 the shaft 69 carries an outwardly extending pin 77 that operates, through an arcuate slot in the cover of the operating mechanism 32 upon an indicating pointer 78 which, as shown in Figure 3 of the drawings, is associated with an arcuate signal area having an upper green zone 79 and a lower red zone 80 which respectively indicate as a signal to an attendant the position of the vacuum insulated switch contacts. For example, when the pointer 78 points to the green zone 79, the energy storing spring 62 will be collapsed and the vacuum switch contacts will be in their open circuit position, as shown in Figure 6 of the drawings, and when the pointer 78 points to the red zone 80, the spring 62 will be extended and the vacuum switch contacts will be in their closed circuit position.

In describing the operation of this high tension circuit interrupting switch, it should be stated that the particular installation here shown, for purpose of illustration, is not intended primarily to open a power line under fault current conditions, nor is the switch adapted to be closed in on a faulted circuit. The means here described consists of a conventional air-break switch having a circuit isolating blade 10 of the beaver tail twisting type operated in the conventional manner by rotation of one of the high voltage insulator stands upon which the switch is mounted. Associated with this air-break switch, I show several vacuum insulated switches 40 which give a rapid and improved high voltage circuit interrupting performance. While these vacuum insulated switches can carry the full load current for a short time, the arrangement here shown is not designed to carry the full line current for any considerable period of time. I have here combined these switches with the shunt circuit forming blade 15 that is adapted to normally carry a large portion of the line current when the circuit interrupting switch is in its circuit closed condition.

The vacuum switches 40, as indicated above, are controlled mechanically through a tie-rod 30 which connects with the switch blade operating mechanism. In this manner the operations of the switch blade 10, the shunt circuit forming blade 15 and the vacuum insulated switch 40 are timed so that upon an initial twisting of the switch blade 10 prior to its pivotal movement, the shunt circuit forming blade 15 will break contact with its line terminal 16 and as soon as a sufficient separation of these contacts has occurred, and before a break is established in the circuit between the switch blade 10 and its stationary contact 12, the operating mechanism 32 will be tripped and the vacuum switches 40 will open with an arc-free interruption prior to a complete separation between the switch blade 10 and its stationary contact 12 and finally the switch blade 10 will provide the desired and conventional line isolating air-gap.

Following this operation and as the switch blade 10 continues to move in its upwardly swinging arc and approaches its full circuit open position, as shown by dot and dash lines in Figure 1 of the drawings, the operating mechanism 32 will be reset to close the circuit through the contacts of the several vacuum insulated switches 40 and thus render a re-establishment of the circuit through the switch blade 10 by a closing of the switch blade 10 with its stationary contact 12. In a reverse of the above operation, as in closing the circuit, when the switch blade 10 reaches its circuit closed position, with respect to the stationary contact 12 and during the tail twisting operation thereof, the shunt circuit forming blade 15 will be again moved into its shunt circuit relation with the contacts of the vacuum insulated switches 40 and thus relieve the vacuum insulated switches of a large portion of the line current normally flowing in the high tension circuit.

With this arrangement, the vacuum switches 40 are capable of closing-in single banks of power factor improving condensers as well as closing-in bank to bank such condensers, however, the high frequency and high magnitude inrush current of the latter operation may lead to sputtering of contact material resulting in a reduction in operating life. Therefore, in such circuit closing-in operations, the final closing of the electrical circuit may be accomplished either by the shunt blade 15 or main switch blade 10. This results in a short high frequency spark during which the considerable energy available is liberated harmlessly in the atmosphere. Where operating requirements make a reduction in the high frequency inrush current magnitude desirable, such as might be the case in extremely large adjacent banks, a suitable resistance such as the resistance 37 with its blade wiping contact 38, as shown in Figure 1, can be provided at the arcing contacts. This resistance 37 is cut out when the switch blade 10 is in its full circuit closed position and is not in circuit when the switch blade 10 is operated to open the circuit.

While I have, for the sake of clearness and in order to disclose my invention so that the same can be readily understood, described and illustrated a specific form and arrangement, I desire to have it understood that this invention is not limited to the specific form disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In a high voltage power line circuit disconnecting device, the combination of a pivotally mounted circuit isolating switch blade, a rotatable insulator stand forming a support at the pivotal end of said switch blade, a high voltage arc suppressing circuit interrupting means mounted upon said support, operating mechanism for moving the contacts of said circuit interrupting means from a closed to an open circuit position and back into a closed circuit position as a continuous operation, an operating connection between said rotatable insulator stand for imparting circuit opening and closing movements to said pivotally mounted switch blade, and an independent operating connection between said rotatable insulator stand and said operating mechanism, whereby said operating mechanism will move the contacts of said circuit interrupting means into an open circuit position upon an initial circuit opening operation of said switch blade and back into a circuit closed position as said pivotally mounted switch blade approaches its full open circuit position.

2. In a high voltage power line circuit disconnecting device, the combination of a pivotally mounted circuit isolating switch blade, a rotatable insulator stand forming a support at the pivotal end of said switch blade, a high voltage arc suppressing circuit interrupting means mounted upon said support and having relatively movable circuit controlling contacts, an operating mechanism for moving the circuit controlling contacts of said circuit interrupting means from a closed circuit to an open circuit position and back into a closed circuit position as a substantially continuous operation, an operating connection between said rotatable insulator stand and said pivotally mounted switch blade for imparting pivotal circuit controlling movements thereto, and a second operating connection between said rotatable insulator stand and said operating mechanism, whereby said operating mechanism will operate to move the contacts of said circuit interrupting means first into an open circuit position during the initial rotation movement of said rotatable insulator stand and back into a circuit closed position as said pivotally mounted switch blade is moved into full open circuit position during the final rotational movement of said rotatable insulator stand.

3. In a high voltage power line circuit disconnecting device, the combination of a pivotally mounted circuit isolating switch blade, a rotatable insulator stand forming a support at a pivotal end of said switch blade, a high voltage circuit interrupting means mounted upon said support, said circuit interrupting means comprising a plurality of vacuum insulated switches connected in series circuit with said switch blade, an operating mechanism for moving the contacts of said plurality of vacuum insulated switches from a closed to an open circuit position to simultaneously provide a series of circuit interrupting gaps in the circuit therethrough, a tie rod connection between said rotatable insulator stand and said operating mechanism for controlling said operating mechanism to move the contacts of said vacuum insulated switches into an open circuit position upon an initial circuit opening operation of said switch blade and back into a circuit closed position as said pivotally mounted switch blade approaches its full open circuit position, and an auxiliary circuit forming blade also responsive to the operation of said tie rod connection forming a shunt circuit around the contacts of said vacuum insulated switches when said switch blade is in its circuit closed position.

4. In a high voltage power line circuit disconnecting device, the combination of a pivotally mounted circuit isolating switch blade, a rotatable insulator stand forming a support at the pivotal end of said switch blade, a high voltage circuit interrupting means mounted upon said support, said circuit interrupting means comprising a plurality of vacuum insulated switches connected in series circuit with said switch blade, each of said switches having a stationary and a movable contact arranged alternately in end to end relation, a circuit opening and reclosing mechanism for simultaneously operating the movable contacts of said plurality of vacuum insulated switches from a closed circuit to an open circuit position and back into a circuit closed position as a substantially continuous operation, an operating connection between said rotatable insulator stand and said switch blade for imparting pivotal circuit controlling movements thereto as said insulator stand is rotated and a controlling connection between said rotatable insulator stand and said circuit opening and reclosing mechanism, whereby the movable contacts of said vacuum insulated switches will be operated into an open circuit position upon an initial circuit opening operation of said switch blade and back into a circuit closed position as said pivotally mounted switch blade approaches its open circuit position.

5. The combination with a high voltage air break circuit isolating switch of the type having a pivotally movable blade mounted upon a plurality of insulator stands and operated by rotation of one of said insulator stands, of a circuit breaker having separable contacts operating in an evacuated arc quenching chamber, spring means for biasing said circuit breaker contacts into an open circuit position, a toggle means for holding said circuit breaker contacts in a closed circuit position and maintaining said spring means in an energy storing condition, a latching means for maintaining said toggle in its circuit closed operative condition, a pivotally mounted double ended lever having means at one end operable to trip said latching means during an initial operating movement thereof and operating at its other end to reset said toggle means during the final stage of its pivotal operating movement, a crank arm for imparting pivotal movement to said double ended lever, and a tie rod connection between said rotatable insulator stand and said crank arm, whereby said circuit breaker contacts will open during the initial switch blade opening rotation of said rotatable insulator stand and said toggle mechanism will be reset and close the contacts of said circuit breaker during the final continuous circuit opening rotational movement of said insulator stand.

6. The combination with a high voltage air break circuit isolating switch of the type having a pivotally movable blade mounted upon a plurality of insulator stands and operated by rotation of one of said insulator stands, of a circuit breaker having separable contacts operating in an evacuated arc quenching chamber, spring means for biasing said circuit breaker contacts into an open circuit position, a toggle means for maintaining said spring means in an energy storing condition with said circuit breaker contacts in a closed circuit position, a latching means for maintaining said toggle in its operative condition, a toggle controlling double ended lever means having one end operable to trip said latching means during the initial circuit opening switch blade operating movement of said rotatable insulator stand and having means at its other end operative to reset said toggle means and close the contacts of said circuit breaker during the final circuit opening rotational movement of said insulator stand, an operating connection between said rotatable insulator stand and said lever means, and an adjustable abutment carried by said latching means engageable with said one end of said double ended lever for timing the opening of said circuit breaker contacts during the initial switch blade opening rotation of said rotatable insulator stand and permitting the other end of said double ended lever to reset said toggle mechanism and close the contacts of said circuit breaker during the final circuit opening rotational movement of said insulator stand as said circuit isolating blade approaches its full open circuit position.

References Cited in the file of this patent

UNITED STATES PATENTS

| | | |
|---|---|---|
| 1,860,337 | Prince et al. | May 24, 1932 |
| 1,931,475 | Brasch et al. | Oct. 17, 1933 |
| 2,181,486 | Perryman et al. | Nov. 28, 1939 |
| 2,469,203 | Palme et al. | May 3, 1949 |
| 2,480,622 | Warnock | Aug. 30, 1949 |
| 2,675,446 | Umphrey | Apr. 13, 1954 |
| 2,737,556 | MacNeill et al. | Mar. 6, 1956 |
| 2,740,869 | Jennings | Apr. 3, 1956 |